(12) United States Patent
He

(10) Patent No.: US 8,077,831 B2
(45) Date of Patent: Dec. 13, 2011

(54) METHOD FOR HANDLING EMERGENCY SERVICE IN NETWORK COMMUNICATION

(75) Inventor: Yungu He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 881 days.

(21) Appl. No.: 11/882,924

(22) Filed: Aug. 7, 2007

(65) Prior Publication Data

US 2007/0280430 A1 Dec. 6, 2007

Related U.S. Application Data

(63) Continuation of application No. PCT/CN2006/000699, filed on Apr. 17, 2006.

(30) Foreign Application Priority Data

Apr. 25, 2005 (CN) .......................... 2005 1 0066238

(51) Int. Cl.
*H04M 11/00* (2006.01)
(52) U.S. Cl. .................................. 379/45; 370/395.421
(58) Field of Classification Search .............. 379/37–52; 370/395.42
See application file for complete search history.

(56) References Cited

U.S. PATENT DOCUMENTS

| | | | |
|---|---|---|---|
| 6,466,651 B1 | 10/2002 | Dailey | |
| 7,016,478 B2 * | 3/2006 | Potorny et al. | 379/49 |
| 7,099,332 B2 * | 8/2006 | Leung | 370/395.42 |
| 2002/0176404 A1 | 11/2002 | Girard | |
| 2003/0223431 A1 * | 12/2003 | Chavez et al. | 370/395.42 |
| 2005/0047340 A1 | 3/2005 | Babiarz et al. | |
| 2005/0083912 A1 | 4/2005 | Afshar et al. | |

FOREIGN PATENT DOCUMENTS

| | | |
|---|---|---|
| CN | 1167559 | 12/1997 |
| CN | 1167559 A | 12/1997 |
| WO | WO 9716931 | 5/1997 |
| WO | WO-03/043368 A1 | 5/2003 |
| WO | WO03043368 A1 | 5/2003 |

OTHER PUBLICATIONS

Extended European Search Report for European Application No. 06722348.7 including supplementary European search report and European search opinion (Feb. 9, 2009).

(Continued)

*Primary Examiner* — Curtis Kuntz
*Assistant Examiner* — Maria El-Zoobi
(74) *Attorney, Agent, or Firm* — Finnegan, Henderson, Farabow, Garrett & Dunner LLP

(57) ABSTRACT

The present invention discloses a method for handling an emergency service in a network communication, including: sending, by an emergency service initiating side, an emergency service identifier together with the emergency service to a network side; and allocating, by the network side, resource to a received service firstly when determining that the received service is an emergency service in accordance with the emergency service identifier. With the present invention, a corresponding emergency service may be identified effectively in a network provided with an independent bearer-control-layer entity, and a resource may be allocated to the emergency service in accordance with a special resource allocation policy. Therefore, it is possible to guarantee the connectivity and the resource for the emergency service as requested in the network, and hence to reduce an unexpected and unnecessary loss.

10 Claims, 3 Drawing Sheets

OTHER PUBLICATIONS

Communication from European Patent Office for Application No. EP 06 722348.7 mailed May 11, 2010 (4 pages).

Communication from Chinese Patent Office for Applicant No. 200510066238.5 mailed Jun. 8, 2007 (4 pages).

Communication from Chinese Patent Office for Applicant No. 20071018496.7 mailed Jun. 5, 2009 (5 pages).

Written Opinion of the International Search Authority in PCT Application No. PCT/CN2006/000699 mailed Aug. 10, 2006 (3 pages).

* cited by examiner

METHOD FOR HANDLING EMERGENCY SERVICE IN NETWORK COMMUNICATION

The present application is a continuation of PCT application PCT/CN2006/000699, filed on Apr. 17, 2006, entitled "A METHOD FOR HANDLING THE EMERGENCY SERVICE IN NETWORK COMMUNICATION", which is incorporated by reference herein in its entirety.

FIELD OF THE INVENTION

The present invention relates to the field of network communication technologies, and in particular, to a method for handling emergency services in network communication.

BACKGROUND OF THE INVENTION

With the continuous growth of the Internet scale, a great variety of network services and advanced multimedia systems emerged. Since real-time services are sensitive to network transmission delay and delay dithering, etc., they may be affected considerably when a bursty File Transport Protocol (FTP) service or a Hypertext Transport Protocol (HTTP) service involving image files appears on the network. Furthermore, multimedia services occupy a large bandwidth, and consequently, a reliable transmission for key services may be difficult to be ensured by the existing networks.

In view of the above, various Quality of Service (QoS) technologies have emerged as desired. The IETF (Internet Engineering Task Force) have recommended various service models and mechanisms to meet the demand of QoS. At present, it has been widely accepted by the industry that Integrated Service (Int-Serv) model may be used for the access and the edge of a network, and Differentiated Service (Diff-Serv) model may be used for the core of the network.

Since the Diff-Serv model only provides a measure for priority-guaranteed QoS, its actual effect may be unpredictable regardless of its high utilization of wire lines. For this reason, the industry has introduced an independent bearer control layer for differentiated services of a backbone network, and established a set of special Diff-Serv QoS signaling mechanisms. In order to propel applications of Diff-Serv, a QoS test network for the Diff-Serv model, i.e. a QBone test network, promoted by IETF together with some manufacturers and research institutes, has used a Bandwidth Broker model to realize a network resource and topology management, and some other manufacturers have proposed similar QoS server/resource manager technologies to manage topology resources and to coordinate QoS capabilities of respective Diff-Serv regions.

The above methods each establish a resource management layer for a Diff-Serv network to manage topology resources of the network. Since the traditional definition of Diff-Serv has some limitations, the above Diff-Serv model for the resource management may be referred to as a network model with an independent bearer control layer (or a centralized resource control layer) to avoid confusion.

In such a network model with an independent bearer control layer, as illustrated in FIG. 1, a bearer network control server including a Bandwidth Broker or a QoS server/resource manager may be configured with a management rule and network topology, and may allocate resource in response to a service bandwidth request from a user. Information, such as the service bandwidth request from the user, a result of the request, information of a path allocated for the service request by the bearer network resource manager and the like, may be transmitted via signaling among the bearer network control servers of each management domain.

When the bearer control layer handles the service bandwidth request from the user, the path for a user service may be determined, and the bearer network resource manager may notify an edge router to forward a service stream through the designated path.

As to how the bearer network implements forwarding the user service stream through a designated route in accordance with the path determined by the bearer control layer, a primary technology existing in the industry is the Multi-protocol Label Switching (MPLS) technology, which may establish a Label Switched Path (LSP) along the service stream path designated by the bearer control layer using a Resource Reservation, and may establish an end-to-end LSP using the Resource Reservation Protocol-Traffic Engineering (RSVP-TE) or an explicit routing mechanism of the Constraint-Routing Label Distribution Protocol (CR-LDP).

The above methods may entirely guarantee an end-to-end QoS as required by services, but all telecommunication services have to be processed equally according to the above solutions. In other words, a call may be admitted when the resources are adequate, but may be rejected or provided with a degraded QoS when the resources are inadequate. However, some emergency calls in the network require to be admitted unconditionally and without any QoS-degrading no matter how the network status is, for example, 110 (police call), 119 (fire call), 120 (ambulance call) or other emergency calls. If the emergency calls are treated without differentiation, the emergency services may not be handled when the resources are insufficient, which may cause great loss of lives and belongings, or major accidents.

However, no satisfied solution has so far been proposed for handling emergency services in the network on the independent bearer control layer. As a result, it would be difficult to meet the specific demand of emergency services.

SUMMARY OF THE INVENTION

In view of the above, the present invention provides a method for handling emergency service in network communication, which may accordingly offer a solution for handling emergency service in a network with an independent bearer control layer.

To this end, the present invention provides a method for handling emergency service in network communication, comprising:

sending, by an emergency service initiating side, an emergency service identifier together with the emergency service to a network side; and allocating, by the network side, resource to a received service firstly when determining that the received service is an emergency service in accordance with the emergency service identifier.

An application function entity may carry the emergency service identifier in a request message and send the request message when determining that the received service is an emergency service in accordance with identification information on a session initiated from a user.

The identification information on the session may include:

at least one of service identification information and service number information.

The request message may be sent to a Policy Decision Function/Bearer Control Function (PDF/BCF) element of the network side.

The method may further include:

reserving, at the network side, resources for emergency service.

The network side may allocate resource to the emergency service from the reserved resources when the network side receives the request message and determines that the message is a request for emergency service.

The network side may perform a normal resource allocation when the network side receives the request message and determines that the message is a request for emergency service; and the network side may allocate resource to the emergency service from the reserved resources when the normal resource allocation is failed.

The network side may allocate resource to the emergency service from resources unoccupied by the network side when the network side receives the request message and determines that the message is a request for emergency service; and a non-emergency or lower-level service may be released in accordance with a predetermined rule in the case that unused resources are insufficient at the network side; and resource obtained from the released service may be allocated to the emergency service.

The predetermined rule may include:

configurations based on at least one of priority information of service and information of service type.

A message indicative of successful resource allocation may be returned to an entity initiating the request in the case that the corresponding resource has been allocated successfully from the network side to the emergency service.

As may be seen from above solutions provided by the present invention, emergency service may be identified effectively at the PDF/BCF element, and resource may be allocated to the emergency service in accordance with a special resource allocation policy. Thus, it is possible to solve the problem of handling the emergency service in a network with an independent bearer-control-layer entity, and to guarantee the connectivity and the resource in the network when the emergency service is requested. Thus, unexpected and unnecessary loss is reduced.

Meanwhile, the present invention may reduce as much as possible the influence of emergency service on other higher-priority services during resource preemption.

DETAILED DESCRIPTION OF THE INVENTION

In a network with an independent bearer control layer, referred to as a network with the Bearer Control Function (BCF) for simplicity, a bearer control layer may be introduced between a service layer and a bearer network layer. This bearer control layer may accomplish uniform control and management, and the BCF element may perform call controls independent of a bearer, including creation, modification and release of a function in connection with a bearer between end points. Due to the separation of a service from a bearer and the separation of a control from a transport, the control layer enables the interaction between the service layer and the bearer layer. The control layer may provide a translation interface between the SLA (service level agreement) of the service layer and the QoS of the bearer layer, and thus QoS demands of services at different levels may be reflected accurately. A Policy Decision Function includes implementing a service-based local policy control in the bearer layer by using a standard IP mechanism, implementing a mechanism of the service-based policy control with an end-to-end QoS architecture, and providing a dynamic QoS control. A main object of the present invention is to enable a function of identifying and handling of an emergency service, so that the emergency service in the network may be handled reliably, and a great loss of a user concerned may thus be avoided.

Figure 1:
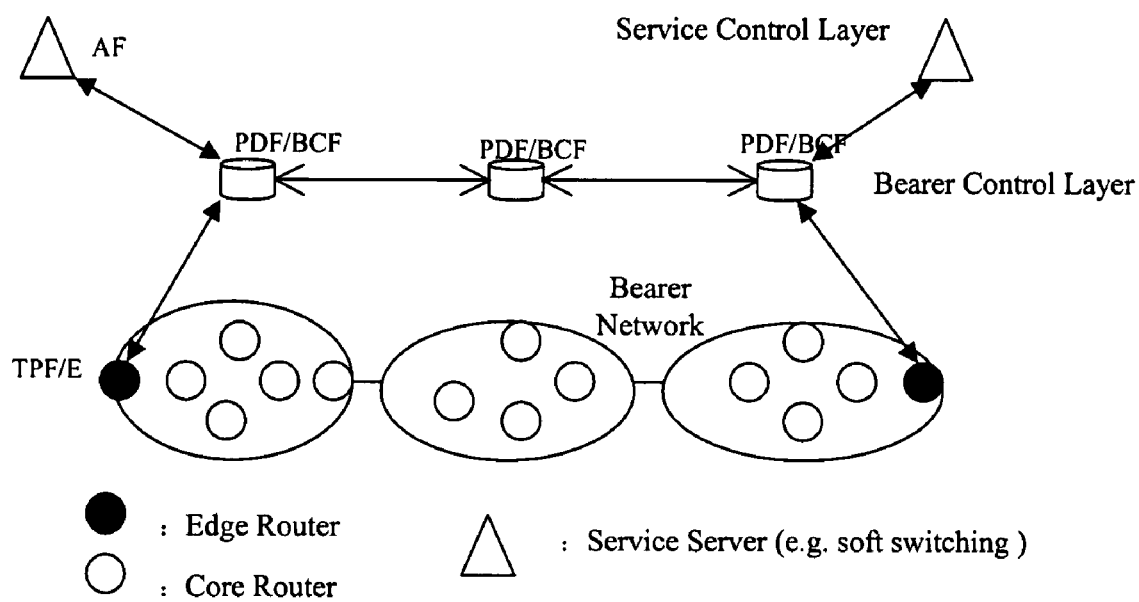
FIG. 1 is a schematic diagram of an architecture for a network in the prior art.

As illustrated in FIG. 1, an emergency service may be identified and a resource may be allocated and a policy may be issued unconditionally for the emergency service on each PDF/BCF element, according to the present invention. The PDF element and the BCF element shown in FIG. 1 may be located in the same physical entity or in different ones. For example, the BCF may be coupled to an Application Function (AF) element via the PDF, or only one logic status may be present in a segment of the network.

For further understanding of the method according to the present invention, the method will be described in detail with reference to the drawings.

Figure 2:
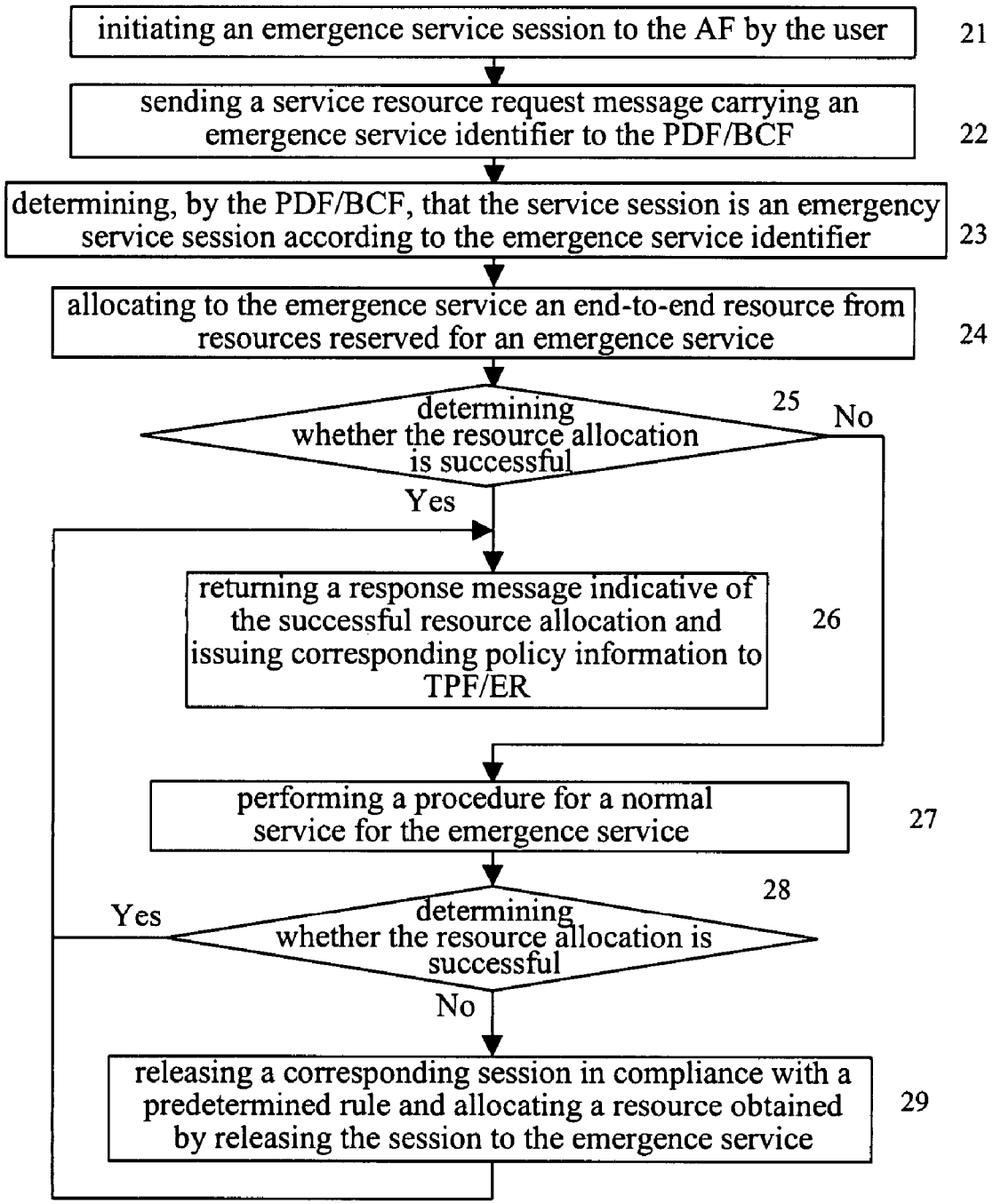
FIG. 2 is a flow chart of implementing a method according to the present invention.
Figure 3:
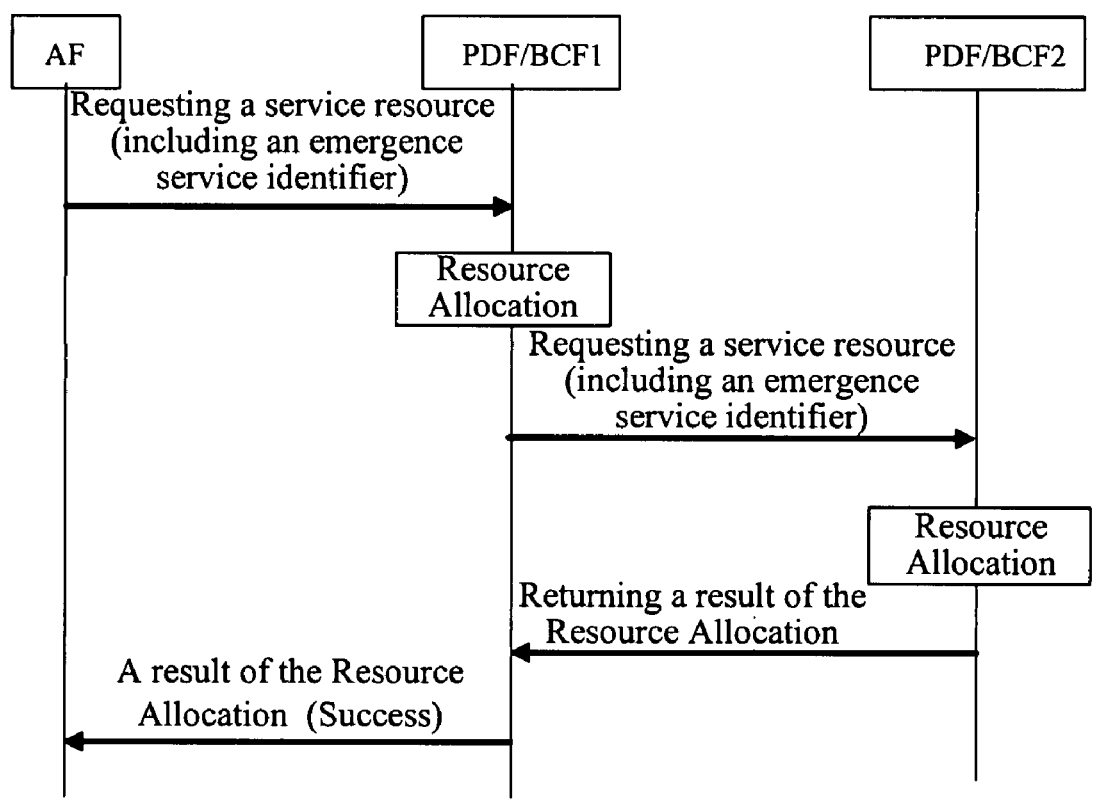
FIG. 3 is a schematic diagram of a main handling procedure for the method according to the present invention.

As shown in FIG. 2 and FIG. 3, the method according to the present invention may include:

A user may initiate an emergency service session to the AF element (Block 21).

At the AF element, an emergency service may be identified among numerous services, and a service resource request message carrying an emergency service identifier may be sent to the PDF/PCF (Block 22).

In this regard, the AF element may determine whether the current session is an emergency service through a service analysis. Particularly, this determination may be made through a service identifier or a number analysis, etc. Upon determination of an emergency service, the AF element may request the PDF element or the BCF element for a QoS resource, where the emergency service identifier needs to be transported through interface signaling.

For example, when an interface protocol adopts the Diameter protocol, an Attribute Value Pair (AVP) for the type of the QoS request may be carried through a Media-Component-Description AVP of an Authentication Authorization Accounting Request (AAR) message of the Diameter, and the former AVP may mark the type of the request as an emergency service. Dependent upon a protocol standard, a different AVP may be adopted, and thus will not be limited thereto. If another interface protocol is adopted, a corresponding mechanism is simply required for indication of a service level type to be extended in that protocol, so that an emergency service identifier may be carried and transported to the PDF/BCF element.

Upon receipt of the message, the PDF/BCF element may determine that the service session is an emergency service session according to the emergency service identifier, and thus needs to be handled in accordance with a procedure for emergency service (Block 23).

As illustrated in FIG. 3, the session may require that PDF/BCF elements at different levels perform a resource allocation. However, each PDF/BCF element may handle the received message containing an emergency service identifier in the same way. Furthermore, during an end-to-end transport of QoS signaling, an emergency service identifier may be transported from one PDF/BCF element to another, and thus an individual resource allocation policy may be adopted for an emergency service.

Descriptions will be given hereinafter by way of an example in which the resource allocation for an emergency service is implemented only at one PDF/BCF element.

Still referring to FIG. 2, the resource allocation for an emergency service at a PDF/BCF element may particularly include:

Upon receipt of a resource request for an emergency service from the AF element, the PDF/BCF element may allocate to the emergency service an end-to-end resource, e.g. a path, a bandwidth, etc., from resources reserved for emergency service (Block 24).

Determine whether the resource allocation is successful, and if it is successful, the handling proceeds to Block 26, otherwise, Block 27. (Block 25)

A response message indicative of the successful resource allocation may be returned, and corresponding policy information may be issued to a bearer transmission function (TPF/ER, Traffic Plane Function) (Block 26).

If no corresponding resource is allocated for the emergency service from the reservation resources, a procedure for a normal service may be performed for the emergency service (Block 27).

In other words, an end-to-end bearer resource may be allocated from normal resources in accordance with the QoS requirement of the emergency service.

Determine whether the resource allocation is successful, and if it is successful, the handling may proceed to Block 26, otherwise to Block 29 (Block 28).

Alternatively, the Blocks 24 and 27 may be implemented reversely. In other words, firstly a resource may be allocated to the emergency service from the normal resources in accordance with the procedure for a normal service, and a resource may be allocated from the reserved emergency resources when normal resources are insufficient.

In Block 29, a corresponding session may be released in compliance with a predetermined rule, and a resource obtained by releasing the session may be allocated to the emergency service. The handling may proceed to Block 26 when the resource demand of the emergency service has been met between any two ends.

In particular, if it is determined that the resources are still insufficient during the above allocation and no resource may be allocated to the emergency service, then one normal service session, which has occupied a resource no less than that as required by the QoS demand of the emergency service, may be selected from the normal call sessions in accordance with an operator-predetermined rule or in a random way, and further may be released, and the resource may be allocated to the emergency service.

Moreover, if no single normal service provides a resource capable of meeting the demand of the emergency service, then a plurality of normal services may be selected and released so as to obtain resources to meet the demand of the emergency service.

It shall be noted that a forced release is applicable only to a normal service, and an existing emergency service may not be released forcedly.

If all the resources have been occupied by an emergency service(s), then a new emergency service still may be transported in a best-effort way.

Thus, in the method according to the present invention, a successful resource allocation result may be returned for an emergency service to the AF element all the time, and the interaction for messages of the emergency service may be guaranteed even in the case of device congestion.

In the above procedure, an emergency service may be identified with respect to service priorities. Information on the service priorities may be transported through the interface protocol, and thus the service levels may be varied not limited to the normal and emergency levels. In this regard, during the allocation of a resource, the PDF/BCF element may allocate a lower-level resource if resources at a present level are insufficient, and further may forcedly release a lower-level resource to meet the demand of a higher-level service if all lower-level resources are still incapable of meeting the demand. Typically, the forced release may start from a lowest-level service. A lower-level service may not forcedly release a resource occupied by a same- or higher-level service.

In summary, the embodiments of the present invention address the problems in handling an emergency service in a network with an independent bearer-control-layer entity, and may guarantee the connectivity and the resource for the emergency service in the network when the emergency service is requested, thus resulting in a reduction of an unexpected and unnecessary loss.

While the preferred embodiments of the present invention have been described as above, it shall be appreciated that the scope of the present invention shall not be limited thereto, and those skilled in the art can make various variations and modifications to the embodiments without departing from the scope of the present invention. Thus, it is intended that all such variations and modifications shall fall within the scope of the present invention as solely defined in the claims thereof.

What is claimed is:

1. A method for handling an emergency service in a network with an independent bearer control layer, comprising:
   receiving, by an Application Function (AF) element, a service session initiated by a user;
   determining, by the AF element, whether the service session is an emergency service through a service analysis;
   upon determining the emergency service, sending, by the AF element, a service resource request message carrying an emergency service identifier to a Policy Decision Function/Bearer Control Function (PDF/BCF) element;
   determining, by the PDF/BCF element, that the service session is an emergency service session according to the emergency service identifier; and
   allocating, by the PDF/BCF element, a resource to the service session with a priority higher than those of normal service sessions.

2. The method according to claim 1,
   wherein the AF element determines that the service session is an emergency service in accordance with identification information of the service session initiated from the user.

3. The method according to claim 2, wherein the identification information of the service session comprises:
   at least one of service identification information and service number information.

4. The method according to claim 1, further comprising:
   reserving, at the PDF/BCF element, resources for emergency services.

5. The method according to claim 4, further comprising:
   allocating, by the PDF/BCF element, to the emergency service session a resource from the reserved resources, when the PDF/BCF element receives the request message and determines that the service session is the emergency service session.

6. The method according to claim 4, further comprising:
   performing, by the PDF/BCF element, a normal resource allocation, when the PDF/BCF element receives the request message and determines that the service session is the emergency service session; and allocating to the emergency service session a resource from the reserved resources when the normal resource allocation is failed.

7. The method according to claim 1, further comprising:
allocating, by the PDF/BCF element, to the emergency service session a resource from resources unoccupied by the PDF/BCF element side when the PDF/BCF element receives the request message and determines that the service session is the emergency service session;
releasing, by the PDF/BCF element, an non-emergency or lower-level service in accordance with a predetermined rule if unused resources are insufficient at the PDF/BCF element; and
allocating, by the PDF/BCF element, to the emergency service session a resource obtained through the releasing.

8. The method according to claim 7, wherein the predetermined rule comprises:
configurations based on at least one of priority information of service and information of service type.

9. The method according to claim 1, further comprising:
returning, by the PDF/BCF element, a message indicative of successful resource allocation to the AF element if the corresponding resource has been allocated to the emergency service session successfully.

10. The method according to claim 1, wherein an Attribute Value Pair (AVP) for a type of a QoS request is carried through a Media-Component-Description AVP of an Authentication Authorization Accounting Request (AAR) message of a Diameter when an interface protocol adopts a Diameter protocol.

* * * * *